Patented Feb. 5, 1929.

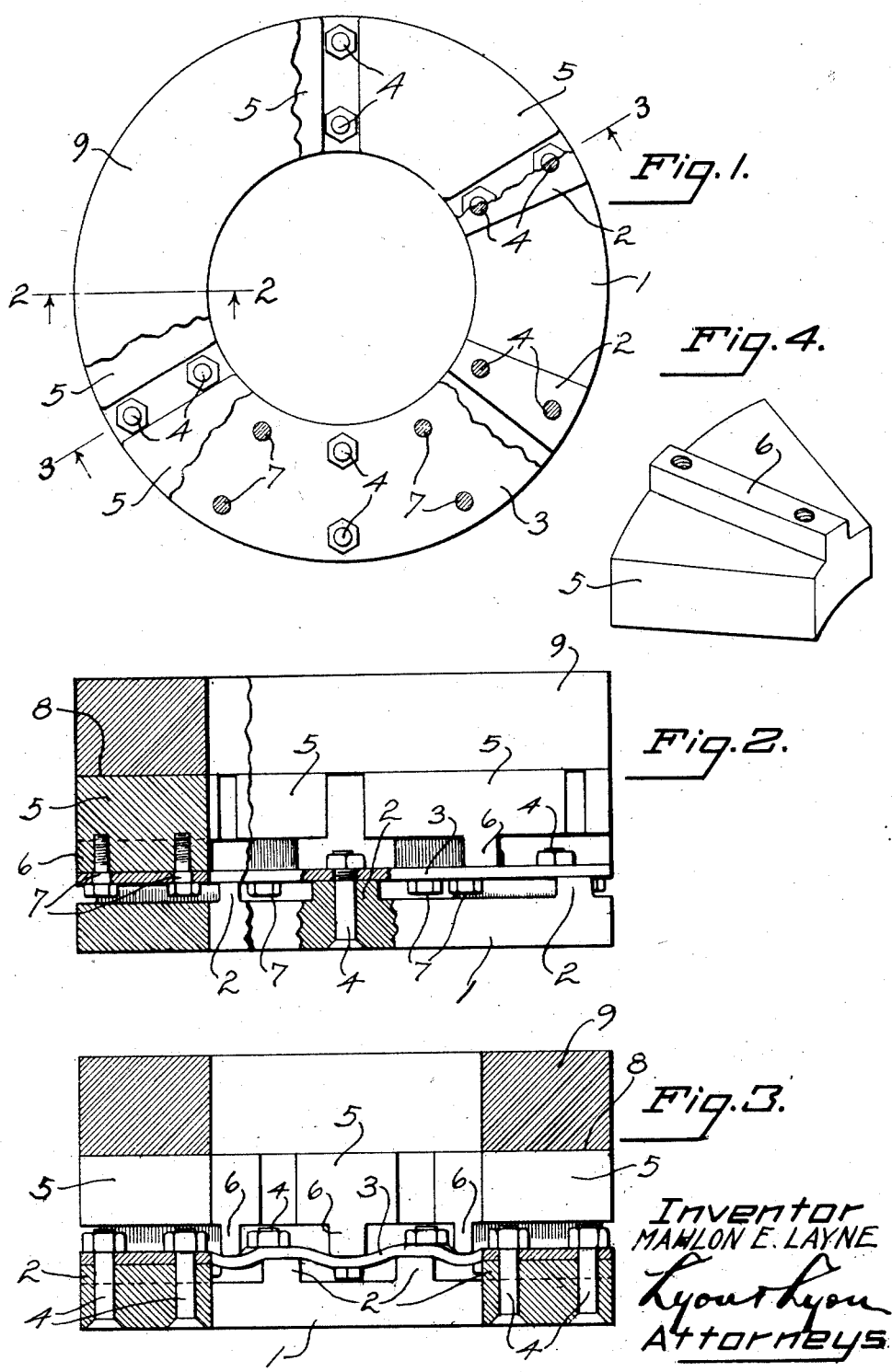

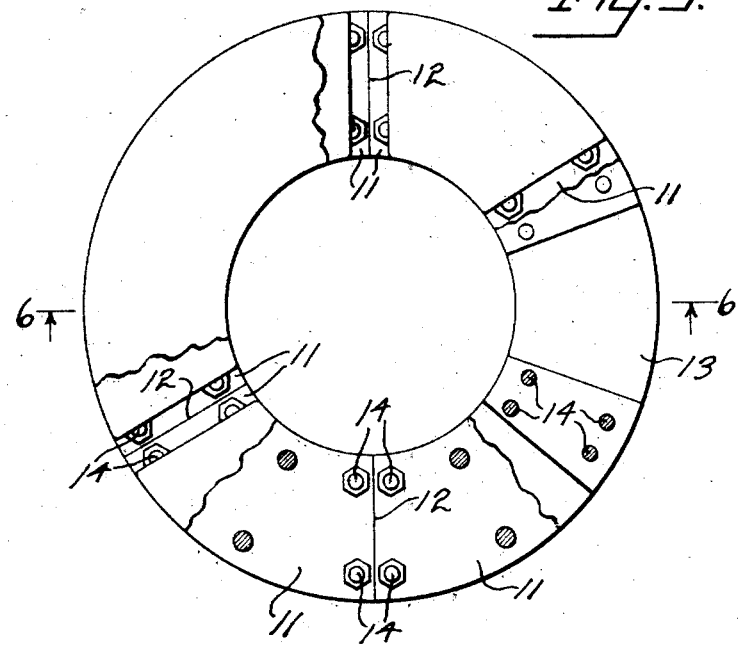
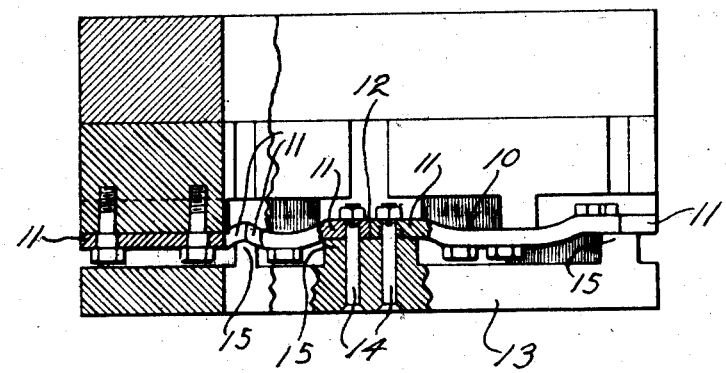

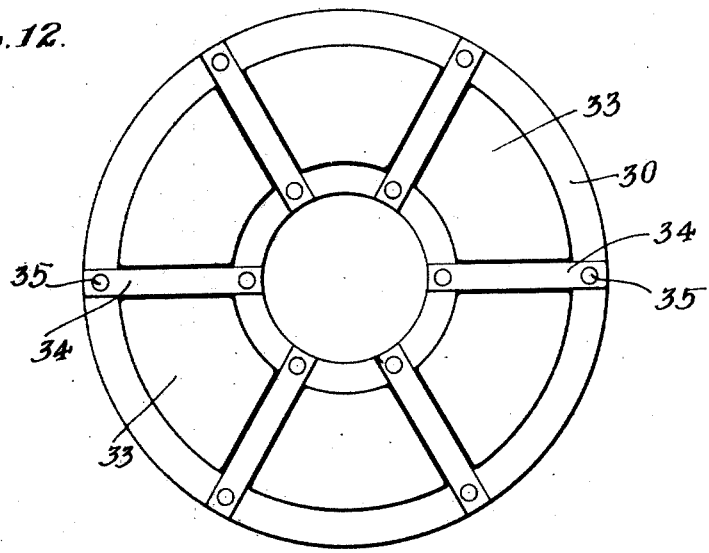
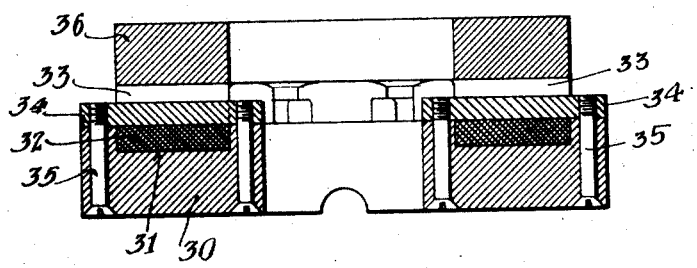
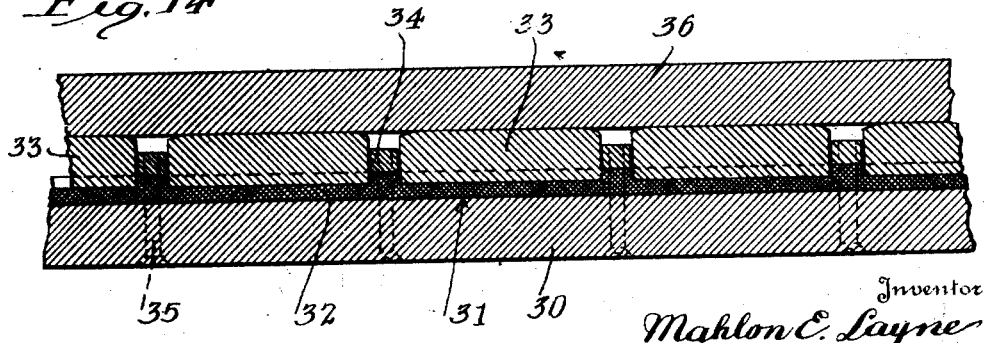

1,701,078

UNITED STATES PATENT OFFICE.

MAHLON E. LAYNE, OF HOUSTON, TEXAS.

THRUST BEARING AND ALIGNING METHOD.

Application filed April 5, 1924. Serial No. 704,387.

This invention relates to thrust bearings and to the method of aligning the same, and is particularly directed to heavy duty bearings adapted to sustain relatively heavy loads rotating at relatively high speeds.

Heretofore to align the rubbing faces of the bearing members, one of the bearing members, usually the lower member, has been constructed in a plurality of segments which are supported from below and dependent on the lower supporting means to hold the rubbing faces in the proper position to receive the load from the other or upper bearing member. Unless these segmental bearing members or shoes are perfectly constructed and held in perfect position in the bearing, there will be exerted upon one or more of the bearing shoes a greater pressure than is exerted upon the other bearing shoes with the result that the oil film on such bearing shoe or shoes will tend to break down and metal to metal contact exist between the bearing parts, with a resulting high friction and rapid wear upon the bearing members.

The art has heretofore attempted to align these bearing shoes by various means, among which might be mentioned the different types of spring mountings employed for the separate bearing shoes. Both theory and experience has shown, however, that with a spring type of support for the bearing shoes, the pressure on the various bearing shoes cannot be maintained equal, and that the film of lubricant supplied to the different shoes will break down at various points, producing the direct metallic contact between the upper and lower wearing members of the thrust bearing with the resulting undue friction and wear.

While mounting the different segmental shoes on spring supports will permit the upper wearing member of the bearing to force the different segmental shoes into alignment, the upper bearing member of the bearing cannot so force the shoes into alignment without exerting an unequal pressure on one or more of the segmental bearing shoes as the spring support tends to hold or maintain the bearing shoes in their original position.

I have discovered that if, in place of supporting the segmental bearing shoes upon spring or resilient material and depending upon the upper wearing member to force the different segmental bearing shoes down against their resilient supports and thus into alignment, the segmental bearing shoes are mounted upon a material or support which is non-resilient or resistant and deformable in nature, the separate segmental bearing shoes may be forced down against such material and be permanently set into alignment and thereafter such a support will not continually apply an unequal pressure to the different bearing shoes and a uniform pressure will be exerted on the wearing surfaces of the bearing.

By this invention I have provided a thrust bearing employing a plurality of segmental bearing shoes which are permanently supported in the requisite position to properly maintain an oil film between the wearing surfaces of the bearing and thus do not yield during the action of the bearing or move out of alignment. Moreover, I am able to provide such a permanently aligned bearing without having to perfectly machine and construct all the parts of the bearing; as will be apparent from the following description of the bearing and the method of aligning and constructing same.

I have also provided a thrust bearing, which, when the shaft supported upon the bearing is rotated in its intended direction, the oil around the bearing will be forced between the wearing surfaces of the bearing so as to aid in maintaining the desired film of lubricant.

The objects and advantages of this invention will be apparent from a description of the preferred method of aligning the bearings and the thrust bearing so produced contained hereinafter.

In the accompanying drawings I have illustrated the preferred examples of the thrust bearings embodying my invention and have illustrated the method of aligning and producing such bearings.

In the drawings

Figure 1 is a plan view of a thrust bearing embodying the invention, certain parts being broken away.

Fig. 2 is a side elevation of Fig. 1, the left side of the view being broken away to show the bearing as viewed in section on the line 2—2 of Fig. 1, and the middle portion of the view being broken away to illustrate one of the abutments of the lower part of the bearing.

Fig. 3 is a vertical section taken through the bearing on the line 3—3 of Fig. 1 showing the bearing after the application of a force sufficient to set the bearing in its finished position.

Fig. 4 is a perspective view of a segmental bearing shoe and represents the same in an inverted position.

Fig. 5 is a plan view partially broken away of the second embodiment of the invention.

Fig. 6 is a side elevation of Fig. 5 with the left edge of the view broken away to show the bearing as viewed in section on the line 6—6 of Fig. 5 and the medial portion broken away to illustrate one of the abutments.

Fig. 12 is a plan view of a further embodiment of the invention.

Fig. 13 is a vertical section of the bearing shown in Fig. 12.

Fig. 14 is a developed vertical section of Fig. 12,

Figure 7:
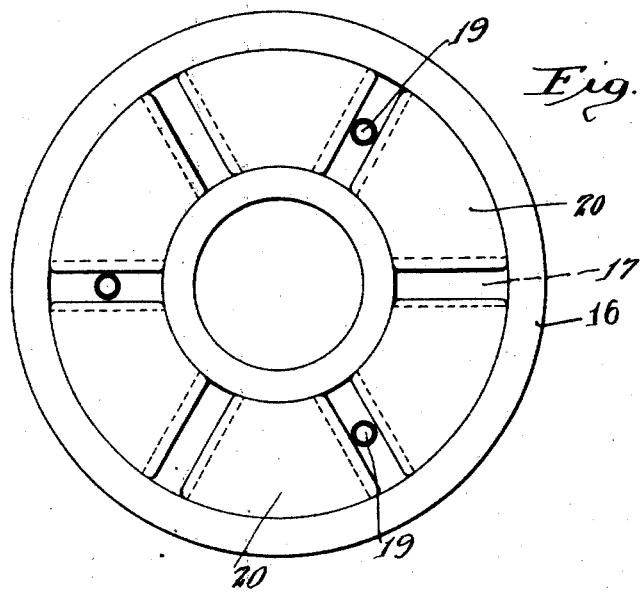
Fig. 7 is a plan view of a modified form of thrust bearing.
Figure 8:
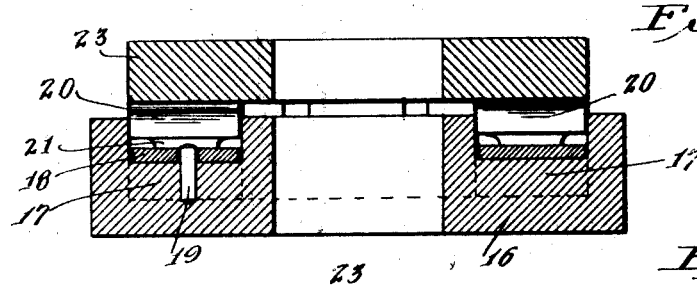
Fig. 8 is a vertical section of the bearing shown in Fig. 7.

Referring first to the first embodiment of the invention, the thrust bearing includes a stationary base member 1. Said base member 1 is provided on its upper side with a plurality of radially disposed abutments 2 on which rests a suspension plate 3, which in the present instance is in the annular form. This plate 3 should be composed of wrought iron or low carbon steel or similar material which is relatively low in elastic properties and of great strength, and which is capable of being permanently deformed by pressure applied thereto while retaining a relatively high strength. Said plate or ring 3 is preferably secured to the base member 1 by means of bolts 4 passing through the abutments 2. The upper face of these abutments 2 thus operate to support the under face of the annular plate 3 at a plurality of points of radial zones, preferably said zones being disposed equidistant and circumferential about the axis of the bearing. The annular plate 3 being secured by the bolts 4 to the base member 1, said plate is held from rotating during operation of the bearing and the permanent set to be effected in the plate 3 will not be altered by rotating the plate 3 over the abutments 2. It is to be preferred for reasons hereinafter set forth that the holes in the plate 3, through which the bolts 4 pass, should be larger than the diameter of the bolts 4.

Supported on the upper side of the plate 3 is provided a plurality of segmental bearing shoes 5. Said shoes are supported on the upper face of the plate at points, lines or zones disposed intermittent the abutments 2. To supporting the segmental bearing shoes 5, each segmental shoe 5 is provided with a web 6 of reduced width, each web 6 extending radially with respect to the axis of the bearing. Preferably the segmental bearing shoes 5 are permanently secured to the resistant deformable plate 3 by suitable means such as bolts 7, said bolts serving to prevent the segmental shoes 5 varying their position with respect to the plate 3, which would result in the shoes 5 being carried from the zone of true alignment.

When the resistant deformable plate 3 is secured to the upper face of the abutments 2, it is normally formed of a flat annular plate or ring, but of a material capable of being permanently set or distorted to effect the automatic alignment of the shoes 5. Preferably after the plate 3 and shoes 5 have been put in place, the upper faces or rubbing faces of the segmental bearing shoes should be simultaneously subjected to a pressure sufficient to produce a permanent set in the material of the plate 3 between the abutments, as indicated by the curved form of such plate as shown in Figures 2 and 3. This permanent set or distortion may be produced by means of an object with a true surface resting on the shoes and thrust downwardly with great force. If desired, this pressure may be produced directly by means of the true face 8 of an upper bearing member 9, which should be thrust downwardly with a slightly greater force than the force which the bearing is designed to thereafter receive or support.

In this form of the invention it should be noted that the several segmental bearing shoes 5 are supported in a hammock-like-manner upon the continuous deformable support 3. By this construction, if one of the segmental shoes is originally of greater height than the remainder, pressure upon the shoes will equalize the position of the shoes, partly by drawing a portion of the plate from the adjacent shoe, thus lowering said elevated shoe and raising the adjacent shoes. This hammock like construction thus facilitates the deformable material in permanently aligning the bearing shoes.

In Figures 5 and 6 a modified construction is shown which is somewhat of the same construction as previously described except that a segmental ring 10 is provided corresponding to the previous integral ring 3 of Figures 1 to 4, inclusive. The segments 11 of the ring 10 abut together at points 12. Each end of these segments 11 is secured to abutments 15 carried by an annular base member 13, bolts 14 being used for that purpose.

By this construction the segmental bearing shoes 5 are supported upon a resistant deformable material (the ring 3 or 10) and pressure exerted upon the securing faces of the bearing shoes will tend to permanently set the bearing shoes in alignment, by causing a permanent distortion in the plates 3 or 10. After this permanent set is attained in the plates 3 or 10, there is no tendency of the plates to force the segmental bearing shoes out of alignment as is found in the prior type of spring mounted segmental shoes, but the thrust bearing 3 will be maintained in true alignment with equal pressure on each bearing shoe, thus permitting equal lubrication of all bearing surfaces of the bearing and materially eliminate friction and wear.

Referring to the form of the invention shown in Figures 7 to 10, inclusive, the bearing comprises a stationary base member 16. Said base member is provided on its upper side with a plurality of abutments 17 on which rests a suspension plate 18 which in the present instance is annular in form. This plate 18 should be composed of wrought iron or low carbon steel or such material as is relatively low in elasticity and of great strength and which is capable of being permanently set by pressure applied thereto while retaining a relatively high strength. Said plate or ring 18 is preferably secured to the base member 1 by means of pins 19 passing vertically through the center of the abutments 17. The upper face of these abutments 17 thus operate to support the under face of the annular plate 18 at a plurality of points at radial zones with respect to the shaft to be supported on the bearing, preferably said zones being disposed equidistant and circumferential about the axis of the bearing, the annular plate 18 being secured by the pins 19 to the base member 16. Said plate is held from rotation during operation of the bearing and the permanent set to be effected in the plate 18 will not be altered by rotating the plate 18 over the abutments 17. It is preferable that the holes in the plate 18 through which the pins 19 pass should be slightly larger than the diameter of the pins 19.

Supported on the upper side of the plate 18 is provided a plurality of segmental bearing shoes 20. Said shoes are supported on the upper face of the plate at points, lines or zones disposed intermittent the abutment 17. To support the segmental bearing shoes 20, each bearing shoe 20 is provided with a web 21 of reduced width, each web 21 extending radially with respect to the axis of the bearing. Preferably the segmental bearing shoes 20 are permanently secured to the resilient deformable plate 18 by suitable means, such as bolts 22, said bolts serving to prevent the segmental shoes 20 varying their position with respect to the plate 18, which would result in the shoes 20 being carried from the zone of true alignment.

Figure 9:
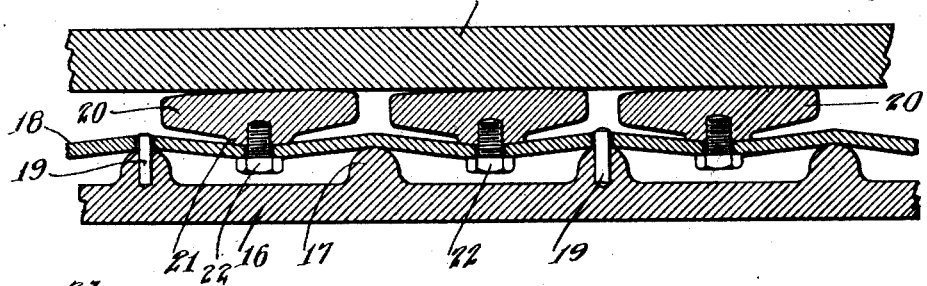
Fig. 9 is a developed vertical section of the bearing.
Figure 10:
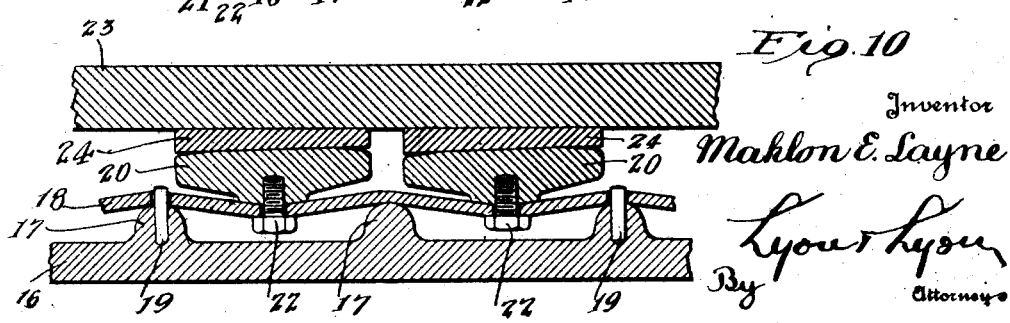
Fig. 10 is a developed vertical section of the means employed for setting the bearing in alignment.

When the resistant deformable plate 18 is secured to the upper face of the abutments 17, it is normally formed of a flat annular plate or ring, but of a material capable of being permanently set or distorted to effect the automatic alignment of the shoes 20. After the plate 18 and shoes 20 have been put in place, the shoes 20 are simultaneously subjected to a pressure sufficient to produce a permanent set in the material of the plate 18 between the abutments, such permanent set being indicated by the curved form of such plate as shown in Figures 9 and 10. In this embodiment of the invention, the wearing face of each bearing shoe 20 is set at a slight angle to the face of the co-acting bearing member such as is indicated by the part 23, the object of this slight angle being to assist the oil entering the space between the part 23 and bearing shoes 20, so as to increase the oil film therebetween. This permanent set of the shoes 20 may be produced by means of angled blocks 24, which are pressed downwardly by an object with a true surface resting on the angled blocks 24 and thrust vertically downward with great force. The force should be greater than the force which the bearing is designed to thereafter receive or support so that after the application of such force, the bearing shoes 20 will be held unyielding in the desired aligned position.

As in the previous embodiment of the invention, it will be noted that the several bearing shoes 20 are supported in a hammock-like manner upon the deformable support 18. This hammock-like construction facilitates the setting of the deformable plate 18 in the permanently set position.

Figure 11:
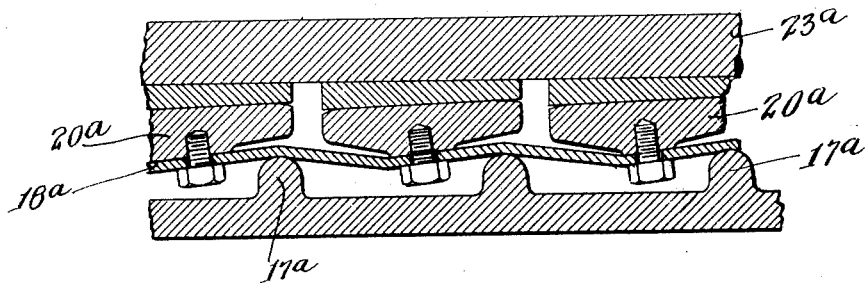
Fig. 11 is a developed vertical section of a modified form of bearing also showing the bearing in the process of alignment.
Figure 15:
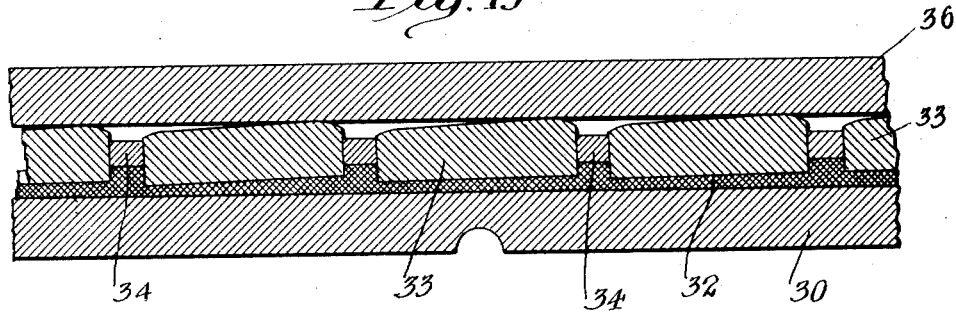
Fig. 15 is a developed vertical section of the bearing set in somewhat different position.

In place of supporting the bearing shoes mid-way between the adjacent abutments they may be set as shown in Figure 11, in which the bearing shoes $20^a$ are supported closer to the abutments $17^a$ adjacent the side of the bearing shoe $20^a$, which is to be set in the higher position. Such a mounting for the bearing will permit the ring $18^a$ to offer a greater resistance to the depression of the high side of the bearing shoe $20^a$ than to the depression of the lower side of the bearing shoe $20^a$ and thus supplement the natural tendency of the plate $18^a$ to hold the bearing shoes in their desired tilted position. It should be pointed out that the angle or tilt of the bearing shoes in this and the preceding embodiment of the invention is somewhat exaggerated as in actual construction the tilt is very slight.

Now referring to the form of the invention shown in Figures 12 to 15, inclusive. The thrust bearing there disclosed comprises a base member 30, which is preferably annular or ring form and provided with an annular flat bottom recess 31 in its upper face. The bottom of this recess 31 receives a quantity of resistant deformable material 32 which is preferably lead or similar material.

Segmental bearing shoes 33 are supported upon the mat of plastic material 32, said bearing shoes being shaped to fit the inner and outer walls of the recess 31, the walls thus serving to retain the bearing shoes on the mat 32. The upper surface of the shoes 33 together constitute the lower wearing surface of the bearing. The shoes 33 are spaced somewhat apart on the base member 30 and between the adjacent shoes a bar 34 extends radially with respect to the axis of the bearing, such bars 34 being held down on the base 30 by suitable means such as the pins 35. The bars 34 are intended to entirely cover the mat 32 between the adjacent bearing shoes. In use the bearing has the customary upper bearing member 36.

Figure 16:
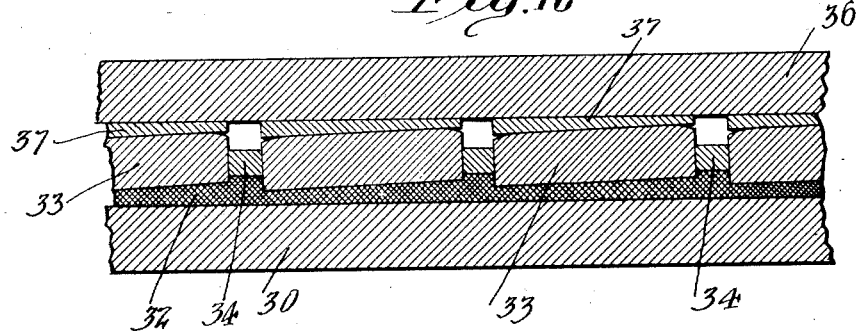
Fig. 16 is a developed vertical section of the bearing showing the method of setting the bearing in the position shown in Fig. 15.

This form of the invention may have its bearing shoes 33 permanently set in alignment by either of the processes shown in connection with the previous embodiment of the invention—that is all the bearing shoes 33 may be subjected simultaneously to a force exerted in an axial direction, which force is substantially greater than the force to which the bearing shoes are designed to thereafter receive. This force may be exerted from an object having a true surface so that all the shoes have their wearing faces aligned as in Figure 14 or they may be pressed downward by angled blocks such as 37 shown in Figure 16 to provide a slight tilt to the wearing surfaces of the bearings in order to enable the lubricant to better find its way between the wearing surfaces of the bearing. In either case the mat 32 will be placed firmly around the bottom of the shoes 33 and up between the space between the shoes, being held from escaping by the bars 34.

By this construction the bearing shoes are held as in the previous embodiments of the invention in permanent aligned position so that the desired oil film may be retained between the bearing faces. It is understood, of course, that each of the bearings shown are in use enclosed in an oil cup such as shown in Figure 1.

It is understood that the embodiments of the invention herein described may be modified in various manners without departing from the spirit of the invention.

No claim is made in this application to the subject matter of Patent Number 1,491,149.

The invention is not limited to the details of construction of the embodiments of the invention shown, but is of the scope set forth in the appended claims.

What I claim is:

1. A thrust bearing comprising a base member having relatively spaced supporting abutments, a resistant deformable member resting upon said abutments, and a plurality of bearing shoes each supported upon the resistant deformable member between adjacent abutments, said deformable member being adapted to maintain the bearing shoes in substantially fixed position under the working load of said bearing, said deformable member further having been deformed to permanently set the bearing shoes in the desired relative operative position.

2. A thrust bearing comprising a rotatable bearing member, a base member having relatively spaced supporting abutments, a resistant deformable member resting upon said abutments, a plurality of bearing shoes each supported upon the resistant deformable member between adjacent abutments and engaging the rotatable bearing member, and means preventing rotation of the bearing shoes, said deformable member being adapted to maintain the bearing shoes in substantially fixed position under the working load of said bearing, said deformable member further having been deformed to permanently set the bearing shoes in the desired relative operating position.

3. In a thrust bearing, the combination of a rotatable member, a base member having relatively spaced supporting abutments, a resistant deformable member secured to said abutments, and extending between the spaces between said abutments and a plurality of bearing shoes each secured to said resistant deformable member at a point between adjacent abutments and engaging the rotatable bearing member, said deformable member being adapted to maintain the bearing shoes in substantially fixed position under the working load of said bearing, said deformable member further having been deformed to permanently set the bearing shoes in the desired relative operating position.

4. A thrust bearing comprising a rotatable bearing member, a base member having relatively spaced supporting abutments, an annular bridge member of resistant deformable material resting upon said abutments, and a plurality of bearing shoes each supported upon the bridge member between adjacent abutments and engaging said rotatable bearing member, whereby separate bearing shoes are supported in hammock like manner upon the same bridge member, said deformable member being adapted to maintain the bearing shoes in substantially fixed position under the working load of said bearing, said deformable member further having been deformed to permanently set the bearing shoes in the desired relative operating position.

5. In a thrust bearing, the combination of a rotatable bearing member, a base member having relatively spaced supporting abutments, a resistant deformable member supported hammock-like upon such abutments and extending between the spaces of such abutments, a plurality of bearing shoes each supported upon such resistant deformable member at points between adjacent abutments so as to be suspended in a hammock-like manner thereby and to engage such rotatable bearing member, the deformable member being adapted to maintain the bearing shoes in substantially fixed position under the working load of the bearing, the deformable member further being deformed to bring each of the bearing shoes into complemental operating positions in which each of the shoes is at a slight angle with the plane of the bearing.

6. A thrust bearing comprising in combination a rotatable bearing member, a base member, a resistant deformable member supported on such base member and a plurality of bearing shoes engaging the rotatable bearing member and supported upon such resistant deformable member, such bearing shoes having their wearing surfaces each making a similar angle with the bearing surface of the rotatable bearing member, said deformable member being adapted to maintain the bearing shoes in substantially fixed position under the working load of said bearing, said deformable member further having been deformed to permanently set the bearing shoes in the desired relative operating position.

7. In a thrust bearing the combination of a rotatable bearing member, a base member having relatively spaced supporting abutments, a resistant deformable member supported hammock-like upon such abutments and extending between the spaces between such abutments, and bearing shoes supported upon such resistant deformable member between adjacent abutments and at one side of the central point between such adjacent abutments, said deformable member being adapted to maintain the bearing shoes in substantially fixed position under the working load of said bearing, said deformable member further having been deformed to permanently set the bearing shoes in the desired relative operating position.

Signed at Memphis, Tennessee, this 18th day of March, 1924.

MAHLON E. LAYNE.